March 24, 1959 J. P. LINDSEY ET AL 2,878,999

INTERPOLATION FUNCTION NETWORK

Filed Sept. 24, 1956 2 Sheets-Sheet 1

INVENTORS
J. P. LINDSEY
D. T. JONES

BY Hudson & Young

ATTORNEYS

INVENTORS
J. P. LINDSEY
D. T. JONES
BY Hudson & Young
ATTORNEYS

United States Patent Office 2,878,999 Patented Mar. 24, 1959

2,878,999

INTERPOLATION FUNCTION NETWORK

Joe P. Lindsey and Donald T. Jones, Bartlesville, Okla., assignors to Phillips Petroleum Company, a corporation of Delaware Application September 24, 1956, Serial No. 611,713

10 Claims. (Cl. 235—151)

This invention relates to an interpolation function network for converting a series of electrical pulses into a continuous signal. In another aspect, it relates to apparatus for multiplying algebraic polynomials.

In various fields of physical measurement and analysis, the data under consideration can advantageously be expressed in the general form of an algebraic polynomial of the type:

$$a_0+a_1x+a_2x^2+ \dots +a_nx^n$$

where the coefficients $a_0$, $a_1$, $a_2$ . . . $a_n$ represent sequential values of the data at respective times, distances, or the like which are represented by the $x$, $x^2$ . . $x^n$, with respect to a reference value associated with the $a_0$ coefficient. In the copending application of R. G. Piety, Serial No. 553,626, filed December 16, 1955, apparatus is disclosed for expressing data in the form of algebraic polynomials and for performing the basic multiplication and division operations on such polynomials. The output signal from the multiplication apparatus of this copending application comprises a series of electrical pulses. In some operations, it is desired that these pulses be converted into a continuous signal which can readily be interpreted or applied in control operations.

In accordance with the present invention, apparatus is provided for converting a series of electrical pulses into a continuous signal. This conversion is accomplished by means of an interpolation network which has a response to a single input pulse that is a cardinal function. The network comprises one or more series-connected low-pass filters which are followed by a phase correction network. The circuit components of the networks are adjusted so that frequencies up to a given value are transmitted and the impulse response of the network is a cardinal interpolation function.

Accordingly, it is an object of this invention to provide in interpolation function network.

Another object is to provide improved apparatus for multiplying algebraic polynomials.

A further object is to provide an interpolation network which has a cardinal function response to a single input pulse.

Other objects, advantages and features of the invention should become apparent from the following detailed description which is taken in conjunction with the accompanying drawing in which.

Figures 3*a*, 3*b*, 4*a* and 4*b* are graphical representations of operating features of the interpolation network of this invention.

Figure 1:
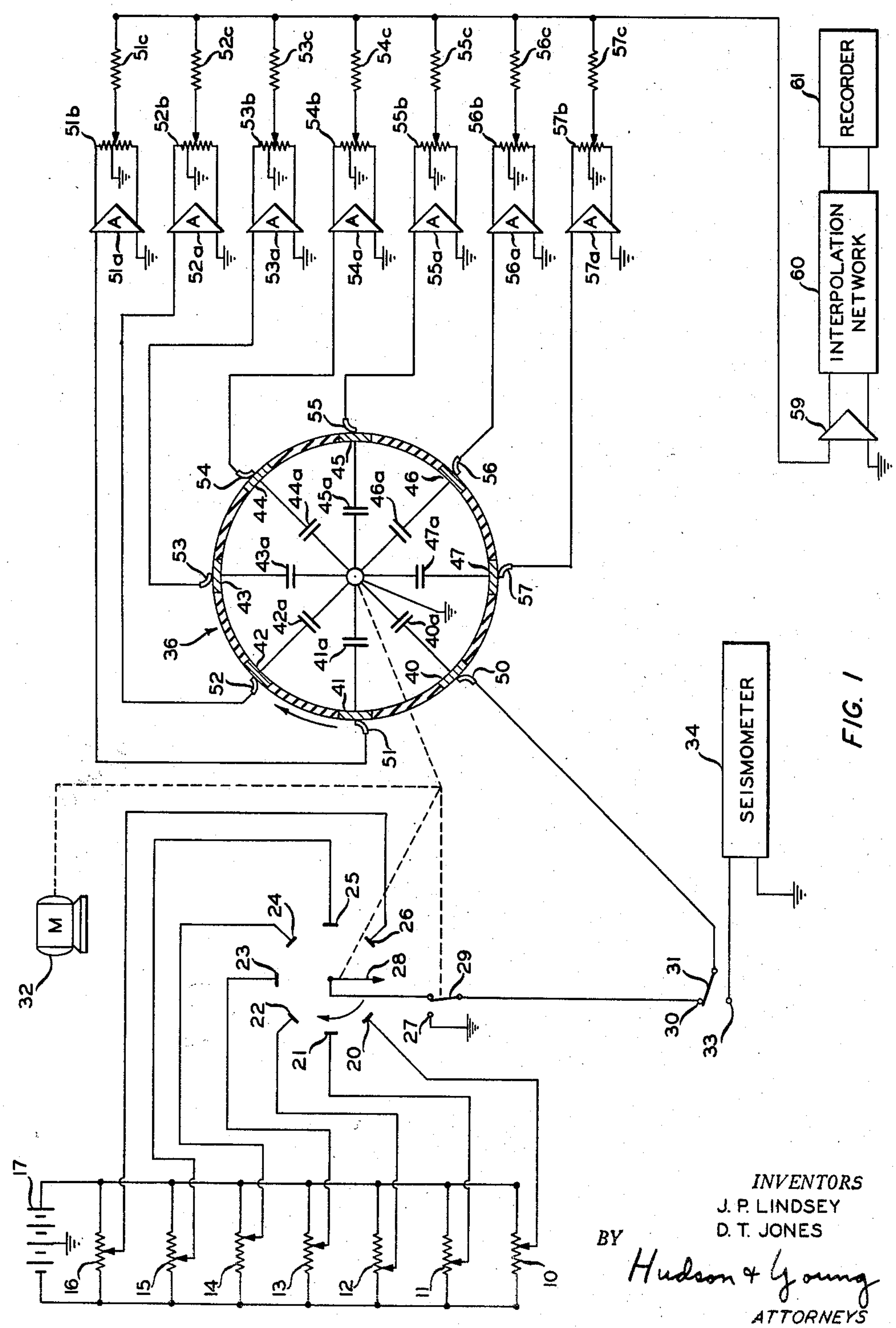
Figure 1 is a schematic circuit diagram of polynomial multiplying apparatus having the interpolation network of this invention incorporated therein.

The apparatus illustrated in Figure 1 of the drawing is capable of providing electrical signals representative of algebraic polynomials and multiplying such signals by a second polynomial. A plurality of potentiometers 10 to

16 are connected in parallel relationship with one another across a voltage source 17 which has a grounded center tap. The contactors of potentiometers 10 to 16 are connected to respective commutator segments 20 to 26 which are adapted to be engaged in sequence by a switch arm 28 which is rotated by a motor 32. Switch arm 28 is connected through a switch 29 to a terminal 30 that is adapted to be engaged by a switch 31. Switch 29 is adapted to be opened by motor 32 in the manner described in detail hereinafter.

Motor 32 also rotates a drum 36 which is formed of electrically insulating material and which has a plurality of conductive segments 40 to 47 spaced about the periphery. Capacitors **40*a* to 47*a* are carried by drum 36 and are connected between respective segments 40 to 47 and a common point of ground potential. A plurality of brushes 50 to 57 are spaced about drum 36 so as to engage respective segments 40 to 47 when drum 36 is in the position illustrated. Brush 50 is connected to switch arm 31. Brushes 51 to 57 are connected to first input terminals of respective isolating amplifiers 51*a* to 57*a*, the second input terminals of these amplifiers being grounded. Potentiometers 51*b* to 57*b* are connected between the output terminals of respective amplifiers 51*a* to 57*a*. The center taps of potentiometers 51*b* to 57*b* are grounded, and the contactors of these potentiometers are connected through respective isolating resistors 51*c* to 57*c* to the first input terminal of a summing amplifier 59. The second input terminal of amplifier 59 is connected to ground. The output terminals of amplifier 59 are connected to the input terminals of an interpolation network 60. The output terminals of network 60 are connected to the input terminals of a suitable voltage indicating device, such as a recorder 61**.

The first output terminal of a seismometer 34 is connected to a terminal 33 which is adapted to be engaged by switch arm 31 so as to connect the output signal from the seismometer to brush 50. The second output terminal of seismometer 34 is grounded.

Drum 36 and the circuit associated therewith are adapted to multiply a first polynomial by a second polynomial. For example, it will be assumed that it is desired to multiply a first polynomial of the form:

$$P(x)=a_0+a_1x+a_2x^2+a_3x^3+a_4x^4+a_5x^5+a_6x^6$$

by a second polynomial of the form:

$$Q(x)=b_0+b_1x+b_2x^2+b_3x^3+b_4x^4+b_5x^5+b_6x^6$$

The contactors of potentiometers **51*b* to 57*b* are set in accordance with the respective coefficients $a_0$, $a_1$ . . . $a_6$ of the first polynomial. These settings are made so that the voltages at the contactors of the potentiometers are representative of the output voltages of the respective amplifiers multiplied by the coefficients set on the potentiometers. The network illustrated in the left hand side of Figure 1 is provided to generate an electrical signal which is representative of the second polynomial. This is accomplished by adjusting the contactors of potentiometers 10 to 16 so that the voltages at the contactors of these potentiometers are representative of the coefficients $b_0$, $b_1$ . . . $b_6$ of the second polynomial. When switch arm 28 is rotated in the illustrated clockwise direction, the voltage at this switch arm sequentially acquires the values at the contactors of potentiometers 10 to 16. This voltage is applied to brush 50 if switch 31 is in engagement with terminal 30. Drum 36 and switch arm 28 are synchronized so that both rotate at the same angular velocity. Switch 29 is opened by motor 32 to engage grounded contact 27 after the completion of one rotation of drum 36** and remains open during the second rotation of the drum. This operation can readily be accomplished by the use of suitable gears and cams.

The capacitors 40*a* to 47*a* initially are discharged so that zero voltages are applied to the inputs of amplifiers 51*a* to 57*a*. At the end of one-eighth of a revolution of drum 36, switch arm 28 engages segment 20 so that a voltage representative of the coefficient $b_0$ is applied through segment 50 to capacitor 47*a*. At the end of one-fourth of a revolution of drum 36, capacitor 47*a* is connected to brush 51 through commutator segment 47. This results in a voltage representative of $b_0$ being applied to the input of amplifier 51*a*. The output voltage of this amplifier is multiplied by a factor representative of the coefficient $a_0$ and the resulting signal is applied to the input of amplifier 59. At this same time, the second coefficient $b_1$ is applied to capacitor 46*a* through brush 50.

At the end of three-eighths of a revolution of drum 36, capacitor 47*a* is connected to brush 52 through segment 47. The voltage $b_0$ on capacitor 47*a* is multiplied by the coefficient $a_1$ set on potentiometer 52*b*. At the same time, the $b_1$ voltage on capacitor 46*a* is multiplied by the $a_0$ setting of potentiometer 51*b*. The two voltages $a_0b_1$ and $a_1b_0$ are applied to the input of summing amplifier 59. It should be evident that as drum 36 continues to rotate, the multiplication and summation process continues in the manner described. The sequential output signals from amplifier 59 are representative of the coefficient of a polynomial that is the product of the two polynomials being multiplied. This product is as follows:

$$P(x)Q(x)=a_0b_0+(a_0b_1+a_1b_0)x+(a_0b_2+a_1b_1+a_2b_0)x^2+\dots$$

It should be evident that the output signal from amplifier 59 represents a series of pulses which represent the coefficients of the product polynomial. For some operations, it is desirable that this output signal be a continuous voltage. Such a signal is desirable for example when the polynomial multiplying apparatus is employed to transform seismic signals. This multiplication apparatus can be used to advantage to transform the output signal of a seismometer by means of a correlation function to enable a preselected vibration pattern to be recognized in the seismometer output. This is accomplished by setting the contactors of potentiometers 51*b* to 57*b* in accordance with a desired vibration pattern to be recognized, as is described in detail in said application Serial No. 553,626. Switch 31 is moved into engagement with terminal 33 so that the output signal from a seismometer 34 is applied to brush 50. When the preselected vibration pattern to be recognized present in the seismometer output, the resulting signal from amplifier 59 exhibits a maximum. The recognition is an auto-correlation of the two signals. In such an operation, interpolation network 60 is employed to advantage to provide a smooth output signal to recorder 61.

Figure 2:
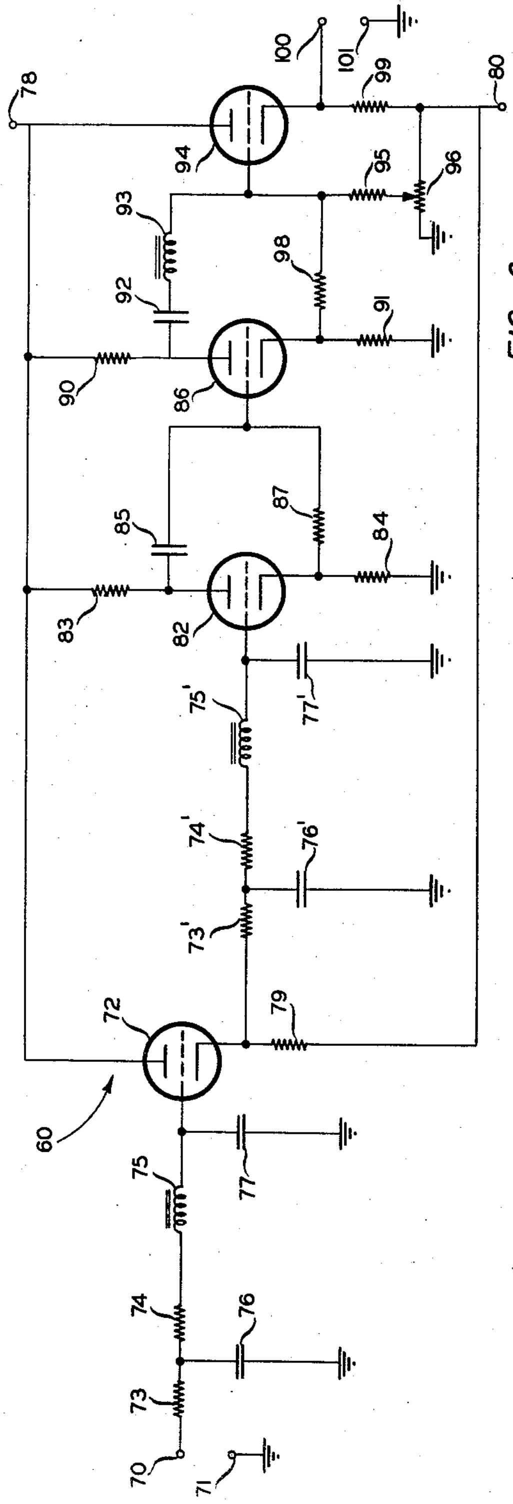
Figure 2 is a schematic circuit drawing of the interpolation network of this invention.

Network 60 is illustrated in detail in Figure 2. Terminals 70 and 71 represent the input terminals of this network. Terminal 70 is connected to the control grid of a triode 72 through resistors 73 and 74 and inductor 75, these elements being connected in series relationship. Input terminal 71 is connected to ground. A capacitor 76 is connected between ground and the junction between resistors by 73 and 74, and a capacitor 77 is connected between ground and the control grid of triode 72. This network thus provides a low-pass filter.

A second low-pass filter is provided which is identical to that previously described and wherein corresponding elements are designated by like primed reference numerals. Triode 72 is employed as a cathode follower to isolate the two filter stages. The anode of triode 72 is connected to a terminal 78 which is maintained at a positive potential, and cathode of triode 72 is connected through a resistor 79 to a terminal 80 which is maintained at a negative potential. The cathode of triode 72 is also connected to the first terminal of resistor 73'. Inductor 75' is connected to the control grid of a triode 82. The anode of triode 82 is connected through a resistor 83 to terminal 78, and the cathode of triode 82 is connected to ground through a resistor 84.

The anode of triode 82 is connected to the control grid of a triode 86 through a capacitor 85. The cathode of triode 82 is connected to the control grid of triode 86 through a capacitor 85. The cathode of triode 82 is connected to the control grid of triode 86 through a resistor 87. The anode of triode 86 is connected to terminal 78 through a resistor 90, and the cathode of triode 86 is connected to ground through a resistor 91. The anode of triode 86 is connected to the control grid of a triode 94 through a capacitor 92 and an inductor 93 which are connnected in series relationship. The cathode of triode 86 is connected to the control grid of a triode 94 through a resistor 98. The control grid of triode 94 is connected through a resistor 95 to a contactor of potentiometer 96. The end terminals of potentiometer 96 are connected to terminal 80 and to ground, respectively. The anode of triode 94 is connected to terminal 78, and the cathode of triode 94 is connected through a resistor 99 to terminal 80. The cathode of triode 94 is connected to a first output terminal 100 of the network. The second output terminal 101 is connected to ground.

Figure 3B:
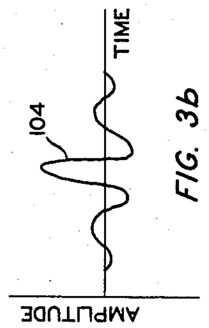
Figure 3A:
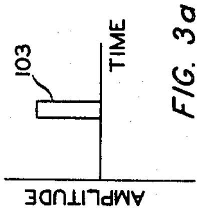
Figure 4B:
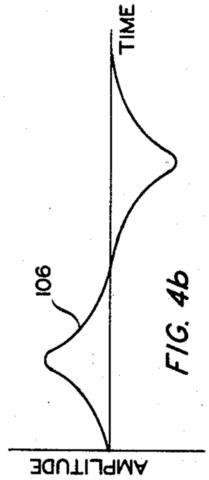
Figure 4A:
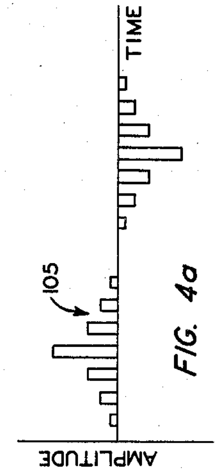

The circuits between triodes 82 and 86 and triodes 86 and 94 have been found to provide proper phase correction with respect to frequency to give desired response characteristics to the network. The response of the network is illustrated in Figures 3*a*, 3*b*, 4*a* and 4*b*. If a single input pulse (103) of the form shown in Figure 3*a* is applied between terminals 70 and 71, the output signal between terminals 100 and 101 is of the form 104 shown in Figure 3*b*. This results in a cardinal function interpolation network. If a series of input pulses, such as 105 in Figure 4*a*, are applied to the input terminals 70 and 71, the output signal 106 of Figure 4*b* is a smooth interpolation of the input pulses.

The Laplace transfer function of the network between terminal 70 and the control grid of triode 72 can be shown to be:

$$\frac{E_0}{E_i}=\frac{\dfrac{1}{R_{73}L_{75}C_{77}C_{76}}}{s^3+\left(\dfrac{R_{74}}{L_{75}}+\dfrac{}{R_{73}C_{76}}\right)s^2+\left(\dfrac{R_{74}}{R_{73}L_{75}C_{76}}+\dfrac{1}{L_{75}C_{77}}+\dfrac{1}{L_{75}C_{76}}\right)s+\dfrac{1}{R_{73}L_{75}C_{77}C_7}}$$

where $E_0$ is the voltage between the control grid of triode 72 and ground, $E_i$ is the voltage between terminals 70 and 71, $R_{73}$ is the resistance of element 73, $R_{74}$ is the resistance of element 74, $L_{75}$ is the inductance of element 75, $C_{76}$ is the capacitance of element 76, $C_{77}$ is the capacitance of element 77, and $s$ is the complex frequency variable associated with Laplace transform theory.

It is known that the Laplace transfer function of a three-pole Butterworth network is $$\frac{E_0}{E_i}=\frac{\omega^3}{s^3+2\omega s^2+2\omega^2 s+\omega^3}$$

where $\omega$ is the cut-off frequency of the network. A three-pole Butterworth network has the general response which is desired in accordance with this invention. By equating coefficients of the two relationships, there is obtained:

$$\frac{R_{74}}{L_{75}}+\frac{1}{R_{73}C_{76}}=2\omega \qquad (1)$$

$$\frac{R_{74}}{L_{75}R_{73}C_{76}}+\frac{1}{L_{75}C_{77}}+\frac{1}{L_{75}C_{76}}=2\omega^2 \qquad (2)$$

$$\frac{1}{R_{73}C_{76}}\cdot\frac{1}{L_{75}C_{77}}=\omega^3 \qquad (3)$$

Thus, for a given $\omega$, which can be in the order of 75 cycles per second for seismic interpretation, for example, it is convenient to choose a suitable choke coil 75. Element 74 can represent the resistance of coil 75, or can be a separate element. If $L_{75}$ and $R_{74}$ are established, the quantity $$\frac{1}{R_{73}C_{76}}$$

is obtained immediately from Equation 1. The quantity $$\frac{1}{L_{75}C_{77}}$$

is then obtained from Equation 3, and $$\frac{1}{L_{75}C_{76}}$$

is obtained from Equation 2. This determines the parameters of the network. In one specific embodiment of this invention, the following circuit components were employed:

| Resistor: | Ohms |
|---|---|
| 73 | 160,000 |
| 73' | 160,000 |
| 74 | 20,000 |
| 74' | 20,000 |
| 79 | 100,000 |
| 83 | 4,300 |
| 84 | 4,300 |
| 87 | 300,000 |
| 90 | 5,600 |
| 91 | 5,600 |
| 98 | 165,000 |
| 95 | 3,600,000 |
| 99 | 100,000 |
| 96 | 200,000 |

| Capacitor: | Microfarads |
|---|---|
| 76 | 0.00662 |
| 76' | 0.00662 |
| 77 | 0.0132 |
| 77' | 0.0132 |
| 85 | 0.01 |
| 92 | 0.00276 |

| Inductor: | Henries |
|---|---|
| 75 | 500 |
| 75' | 500 |
| 93 | 500 |

The four vacuum tubes were each one-half of a tube type 6201. Terminal 78 was maintained at 200 volts and terminal 80 was maintained at −200 volts. Frequencies up to approximately 75 cycles per second were transmitted. The transmission of the network decreased rapidly at higher frequencies.

The described network includes two identical low-pass filter sections which are separated by an isolation cathode follower 72. In some applications, the desired filtering can be obtained by a single network. The same is true of the phase correction networks.

While the invention has been described in conjunction with a present preferred embodiment, it should be evident that it is not limited thereto.

What is claimed is:

1. An interpolation network comprising first and second input terminals; a first tube having an anode, a cathode, and a control grid; a source of direct voltage; a first resistor connected between the positive terminal of said source and the anode of said first tube; a second resistor connected between the negative terminal of said source and the cathode of said first tube; a third resistor and an inductor connected in series between said first terminal and the control grid of said first tube; a first capacitor connected between said second terminal and the junction between said third resistor and said inductor; a second capacitor connected between said second terminal and the junction between said inductor and the control grid of said first tube; a second tube having an anode, a cathode and a control grid; means applying a direct voltage between the anode and cathode of said second tube so that the anode thereof is positive with respect to the cathode; a third capacitor connected between the anode of said first tube and the control grid of said second tube; a fourth resistor connected between the cathode of said first tube and the control grid of said second tube; and means to establish an output signal representative of current through said second tube.

2. An interpolation network comprising first and second input terminals; a first tube having an anode, a cathode, and a control grid; a source of direct voltage; a first resistor connected between the positive terminal of said source and the anode of said first tube; a second resistor connected between the negative terminal of said source and the cathode of said first tube; a third resistor and an inductor connected in series between said first terminal and the control grid of said first tube; a first capacitor connected between said second terminal and the junction between said third resistor and said inductor; a second capacitor connected between said second terminal and the junction between said inductor and the control grid of said first tube; a second tube having an anode, a cathode and a control grid; a fourth resistor connected between the positive terminal of said source and the anode of said second tube; a fifth resistor connected between the negative terminal of said source and the cathode of said second tube; a third capacitor connected between the anode of said first tube and the control grid of said second tube; a sixth resistor connected between the cathode of said first tube and the control grid of said second tube; a third tube having an anode, a cathode, and a control grid; means applying a direct voltage between the anode and cathode of said third tube so that the anode thereof is positive with respect to the cathode; a fourth capacitor and a second inductor connected in series between the anode of said second tube and the control grid of said third tube; a seventh resistor connected between the cathode of said second tube and the control grid of said third tube; and means to establish an output signal representative of current through said third tube.

3. An interpolation network comprising first and second input terminals; a first tube having an anode, a cathode, and a control grid; a source of direct voltage; a first resistor connected between the positive terminal of said source and the anode of said first tube; a second resistor connected between the negative terminal of said source and the cathode of said first tube; a third resistor and an inductor connected in series between said first terminal and the control grid of said first tube; a first capacitor connected between said second terminal and the junction between said third resistor and said inductor; a second capacitor connected between said second terminal and the junction between said inductor and the control grid of said first tube; a second tube having an anode, a cathode and a control grid; a fourth resistor connected between the positive terminal of said source and the anode of said second tube; a fifth resistor connected between the negative terminal of said source and the cathode of said second tube; a third capacitor connected between the anode of said first tube and the control grid of said second tube; a sixth resistor connected between the cathode of said first tube and the control grid of said second tube; a third tube having an anode, a cathode, and a control grid; means applying a direct voltage between the anode and cathode of said third tube so that the anode thereof is positive with respect to the cathode; a fourth capacitor and a second inductor connected in series between the anode of said second tube and the control grid of said third tube; a seventh resistor connected between the cathode of said second tube and the control grid of said third tube; a first and second output terminals; and means connecting said first output terminal to the cathode of said third tube, said second output terminal being connected to said second input terminal.

4. An interpolation network comprising first and second input terminals; a first tube having an anode, a cathode, and a control grid; means applying a direct voltage between the anode and cathode of said first tube so that the anode thereof is positive with respect to the cathode; a first resistor and an inductor connected in series between said first terminal and the control grid of said first tube; a first capacitor connected between said second terminal and the junction between said first resistor and said inductor; a second capacitor connected between said second terminal and the junction between said inductor and the control grid of said first tube; a second tube having an anode, a cathode and a control grid; a source of direct voltage; a second resistor connected between the anode of said second tube and the positive terminal of said source; a third resistor connected between the cathode of said second tube and the negative terminal of said source; a fourth resistor and a second inductor connected in series between the cathode of said first tube and the control grid of said second tube; a third capacitor connected between said second terminal and the junction between said fourth resistor and said second inductor; a fourth capacitor connected between said second terminal and the junction between said second inductor and the control grid of said second tube; a third tube having an anode, a cathode, and a control grid; a fifth resistor connected between the positive terminal of said source and the anode of said third tube; a sixth resistor connected between the negative terminal of said source and the cathode of said third tube; a fifth capacitor connected between the anode of said second tube and the control grid of said third tube; a seventh resistor connected between the cathode of said second tube and the control grid of said third tube; and means to establish an output signal representative of current through said third tube.

5. An interpolation network comprising first and second input terminals; a first tube having an anode, a cathode, and a control grid; means applying a direct voltage between the anode and cathode of said first tube so that the anode thereof is positive with respect to the cathode; a first resistor and an inductor connected in series between said first terminal and the control grid of said first tube; a first capacitor connected between said second terminal and the junction between said first resistor and said inductor; a second capacitor connected between said second terminal and the junction between said inductor and the control grid of said first tube; a second tube having an anode, a cathode and a control grid; a source of direct voltage; a second resistor connected between the anode of said second tube and the positive terminal of said source; a third resistor connected between the cathode of said second tube and the negative terminal of said source; a fourth resistor and a second inductor connected in series between the cathode of said first tube and the control grid of said second tube; a third capacitor connected between said second terminal and the junction between said fourth resistor and said second inductor; a fourth capacitor connected between said second terminal and the junction between said second inductor and the control grid of said second tube; a third tube having an anode, a cathode, and a control grid; a fifth resistor connected between the positive terminal of said source and the anode of said third tube; a sixth resistor connected between the negative terminal of said source and the cathode of said third tube; a fifth capacitor connected between the anode of said second tube and the control grid of said third tube; a seventh resistor connected between the cathode of said second tube and the control grid of said third tube; a fourth tube having an anode, a cathode, and a control grid;

means applying a direct voltage between the anode and cathode of said fourth tube so that the anode thereof is positive with respect to said cathode; a sixth capacitor and a third inductor connected in series between the anode of said third tube and the control grid of said fourth tube; an eighth resistor connected between the cathode of said third tube and the control grid of said fourth tube; and means to establish an output signal representative of current through said fourth tube.

6. An interpolation network comprising first and second input terminals; a first tube having an anode, a cathode, and a control grid; means applying a direct voltage between the anode and cathode of said first tube so that the anode thereof is positive with respect to the cathode; a first resistor and an inductor connected in series between said first terminal and the control grid of said first tube; a first capacitor connected between said second terminal and the junction between said first resistor and said inductor; a second capacitor connected between said second terminal and the junction between said inductor and the control grid of said first tube; a second tube having an anode, a cathode and a control grid; a source of direct voltage; a second resistor connected between the anode of said second tube and the positive terminal of said source; a third resistor connected between the cathode of said second tube and the negative terminal of said source; a fourth resistor and a second inductor connected in series between the cathode of said first tube and the control grid of said second tube; a third capacitor connected between said second terminal and the junction between said fourth resistor and said second inductor; a fourth capacitor connected between said second terminal and the junction between said second inductor and the control grid of said second tube; a third tube having an anode, a cathode, and a control grid; a fifth resistor connected between the positive terminal of said source and the anode of said third tube; a sixth resistor connected between the negative terminal of said source and the cathode of said third tube; a fifth capacitor connected between the anode of said second tube and the control grid of said third tube; a seventh resistor connected between the cathode of said second tube and the control grid of said third tube; a fourth tube having an anode, a cathode, and a control grid; a sixth capacitor and a third inductor connected in series between the anode of said third tube and the control grid of said fourth tube; an eighth resistor connected between the cathode of said third tube and the control grid of said fourth tube; first and second output terminals; and means connecting said first output terminal to the cathode of said fourth tube, said second output terminal being connected to said second input terminal.

7. An interpolation function network comprising first and second input terminals; first and second output terminals, first, second, third and fourth tubes each having an anode, a cathode and a control grid; means applying a direct voltage between the anode and cathode of said first tube so that the anode thereof is positive with respect to the cathode; first and second resistors and a first inductor connected in series relationship between said first input terminal and the control grid of said first tube; a first capacitor connected between said second input terminal and the junction between said first and second resistors; a second capacitor connected between said second input terminal and the control grid of said first tube; a source of direct voltage; a third resistor connected between the positive terminal of said source and the anode of said second tube; a fourth resistor connected between the negative terminal of said source and the cathode of said second tube; fifth and sixth resistors and a second inductor connected between the cathode of said first tube and the control grid of said second tube; a third capacitor connected between said second input terminal and the junction between said fifth and sixth resistors; a fourth capacitor connected between said second input terminal and the control grid of said second tube; a seventh resistor connected between the positive terminal of said source and the anode of said third tube; an eighth resistor connected between the negative terminal of said source and the cathode of said third tube; a fifth capacitor connected between the anode of said second tube and the control grid of said third tube; a ninth resistor connected between the cathode of said second tube and the control grid of said third tube; a sixth capacitor and a third inductor connected in series relationship between the anode of said third tube and the control grid of said fourth tube; and a tenth resistor connected between the cathode of said third tube and the control grid of said fourth tube, said first output terminal being connected to the cathode of said fourth tube, and said second output terminal being connected to said second input terminal.

8. Apparatus for multiplying algebraic polynomials comprising means to establish an electrical signal, the amplitude of which varies with respect to time in accordance with the coefficients of one of the polynomials to be multiplied; a plurality of voltage multiplying means, one for each of the coefficients of the second of said polynomials, said voltage multiplying means being adapted to be set so that input signals applied thereto are multiplied by respective coefficients of said second polynomials; a plurality of electrical signal storage means, there being at least one of said signal storage means for each of said multiplying means; means to apply said electrical signal successively to said storage means so that the first of said storage means receives the first portion of said signal and the remainder of said storage means receive portions of said signal which are at respective later times; voltage isolating means connecting said plurality of storage means successively to said respective multiplying means so that respective portions of said electrical signal are applied as input signals to said multiplying means; means to sum the outputs of said multiplying means; and means to interpolate the resulting sum comprising: first and second input terminals; a first tube having an anode, a cathode, and a control grid; a source of direct voltage; a first resistor connected between the positive terminal of said source and the anode of said first tube; a second resistor connected between the negative terminal of said source and the cathode of said first tube; a third resistor and an inductor connected in series between said first terminal and the control grid of said first tube; a first capacitor connected between said second terminal and the junction between said third resistor and said inductor; a second capacitor connected between said second terminal and the junction between said inductor and the control grid of said first tube; a second tube having an anode, a cathode and a control grid; means applying a direct voltage between the anode and cathode of said second tube so that the anode thereof is positive with respect to the cathode; a third capacitor connected between the anode of said first tube and the control grid of said second tube; a fourth resistor connected between the cathode of said first tube and the control grid of said second tube; and means to establish an output signal representative of current through said second tube.

9. The apparatus of claim 8 wherein said means to establish an electrical signal comprises a seismometer.

10. Apparatus for multiplying algebraic polynomials comprising means to establish an electrical signal, the amplitude of which varies with respect to time in accordance with the coefficients of one of the polynomials to be multiplied; a plurality of voltage multiplying means, one for each of the coefficients of the second of said polynomials, said voltage multiplying means being adapted to be set so that input signals applied thereto are multiplied by respective coefficients of said second polynomials; a plurality of electrical signal storage means, there being at least one of said signal storage means for each of said multiplying means; means to apply said electrical signal successively to said storage means so that the first of said storage means receives the first portion of said signal and the remainder of said storage means receive portions of said signal which are at respective later times; voltage isolating means connecting said plurality of storage means successively to said respective multiplying means so that respective portions of said electrical signal are applied as input signals to said multiplying means; means to sum the outputs of said multiplying means; and means to interpolate the resulting sum comprising: first and second input terminals; a first tube having an anode, a cathode, and a control grid; means applying a direct voltage between the anode and cathode of said first tube so that the anode thereof is positive with respect to the cathode; a first resistor and an inductor connected in series between said first terminal and the control grid of said first tube; a first capacitor connected between said second terminal and the junction between said first resistor and said inductor; a second capacitor connected between said second terminal and the junction between said inductor and the control grid of said first tube; a second tube having an anode, a cathode and a control grid; a source of direct voltage; a second resistor connected between the anode of said second tube and the positive terminal of said source; a third resistor connected between the cathode of said second tube and the negative terminal of said source; a fourth resistor and a second inductor connected in series between the cathode of said first tube and the control grid of said second tube; a third capacitor connected between said second terminal and the junction between said fourth resistor and said second inductor; a fourth capacitor connected between said second terminal and the junction between said second inductor and the control grid of said second tube; a third tube having an anode, a cathode, and a control grid; a fifth resistor connected between the positive terminal of said source and the anode of said third tube; a sixth resistor connected between the negative terminal of said source and the cathode of said third tube; a fifth capacitor connected between the anode of said second tube and the control grid of said third tube; a seventh resistor connected between the cathode of said second tube and the control grid of said third tube; a fourth tube having an anode, a cathode, and a control grid; a sixth capacitor and a third inductor connected in series between the anode of said third tube and the control grid of said fourth tube; an eighth resistor connected between the cathode of said third tube and the control grid of said fourth tube; and means to establish an output signal representative of current through said fourth tube.

References Cited in the file of this patent

UNITED STATES PATENTS 2,610,789 Hales ---------------- Sept. 16, 1952

OTHER REFERENCES

Electronic Analog Computers (Korn and Korn), published by McGraw-Hill Book Co., New York, 1952, page 229.

UNITED STATES PATENT OFFICE

Certificate of Correction

Patent No. 2,878,999 March 24, 1959

Joe P. Lindsey et al.

It is hereby certified that error appears in the printed specification of the above numbered patent requiring correction and that the said Letters Patent should read as corrected below.

Column 1, line 50, for "in interpolation" read —an interpolation—; column 3, line 53, after "recognized" insert —is—; column 4, lines 9, 10, and 11, strike out "The cathode of triode 82 is connected to the control grid of triode 86 through a capacitor 85."; columns 3 and 4, lines 48 to 50, for that portion of the formula reading $$s^3+\left(\frac{R_{74}}{L_{75}}+\frac{}{R_{73}C_{76}}\right)s^2+ \quad \text{read} \quad s^3+\left(\frac{R_{74}}{L_{75}}+\frac{1}{R_{73}C_{76}}\right)s^2+$$

Signed and sealed this 18th day of August 1959.

[SEAL]

Attest:
KARL H. AXLINE,
*Attesting Officer.*

ROBERT C. WATSON,
*Commissioner of Patents.*